Dec. 28, 1965  W. KISTLER  3,225,390
METHOD OF PRODUCING FILTER PLUGS
Filed Oct. 3, 1960  4 Sheets-Sheet 1

Inventor
Werner Kistler
by
Michael S. Striker

Dec. 28, 1965   W. KISTLER   3,225,390
METHOD OF PRODUCING FILTER PLUGS
Filed Oct. 3, 1960   4 Sheets-Sheet 2

| S | | A | |
|---|---|---|---|
| No | mm H | L −30° to +30° | Q −30° to −90° and +30° to 150° |
| 1 | 5 | 74 | 58 |
| 2 | 5 | 79 | 70 |
| 3 | 5 | 84 | 90 |
| 4 | 5 | 73 | 64 |
| 5 | 5 | 80 | 90 |
| 6 | 5 | 80 | 96 |
| 7 | 5 | 87 | 63 |
| T | 35 | 557 | 521 |
| V=L/Q | | 1.07 | |

Inventor
Werner Kistler
by Michael S. Striker
Atty

United States Patent Office 3,225,390
Patented Dec. 28, 1965

3,225,390
METHOD OF PRODUCING FILTER PLUGS
Werner Kistler, Glasern, Rapperswil (Sankt Gallen), Switzerland, assignor to Paul Adolf Muller, Triesenberg, Liechtenstein
Filed Oct. 3, 1960, Ser. No. 60,224
1 Claim. (Cl. 19—66)

Methods known hitherto for the manufacture of filter plugs, more especially for cigarettes, are divisible into two classes:

(a) Methods in which a strip of paper is roughened, perforated or otherwise separated into fibres and then formed into a filter plug by the strip being rolled up or gathered together;

(b) Methods in which a filter rope is made from loose fibre material.

The present invention refers to a method for manufacturing filter plugs from loose fibre material, i.e. to a method of class (b) in the foregoing. In making suitable filter plugs from loose fibres, the greatest difficulty is encountered in ensuring by appropriate means an adequate cohesion between the individual fibres inside the plug. It is known that filter plugs are cut off from an endless filter rope in length of, say, 10 to 12 mm. It will be appreciated that in such a short section of bunched fibres the single fibres may, unless secured to one another, fall out or be sucked out during use. This is more especially the case since, of course, not all the fibres are of the same approximate length as the section, a large number contained in such a section being short fibre ends.

There are a number of proposals for ensuring adequate inner cohesion in such a bundle of fibres. By way of example, the use of thermoplastic fibres was proposed and the fibre rope heated so that the fibres, being on the point of melting, are welded together at their points of contact. In widely used filter plugs a sufficient number of points of adhesion between contiguous fibres within the fibre bundle is created by the addition of a binding agent. It has also been proposed to add a certain quantity of thicker supporting fibres to the fibres in the bundle with a view to obtaining a good inner cohesion through a uniform distribution of these thicker fibres or threads in the bundle.

Experience has shown, however, that the creation of a supporting skeleton from such contact points within the fibre bundle formed by the adhesion of the thermoplastic fibres to one another or to the non-thermoplastic fibres cannot produce a satisfactory cigarette filter. The reason is that the thermoplastic fibres must be heated to such a temperature that they almost melt in order to be welded together. It will be obvious that, although a very compact rope of fibres can be produced in this manner, the structure of this formation resembles a porous sponge rather than a rope of fibres stabilized by a supporting skeleton. It is not surprising to the filter expert that such cigarette filters having not become established in practice, for a porous filter produced in this manner must necessarily have a very high resistance to drawing and is hardly suitable as a filter plug for cigarettes.

Another known, but entirely different method of using thin fibres, which are eminently suitable for absorption purposes, consists in spreading such a fibrous material in a thin layer on a paper base and making this combined material into a filter rope by rolling it up or gathering it together. Such filter plugs using a "lapped" paper are known in large numbers and the most varied forms.

According to the present invention, a method of making a tobacco smoke filter is proposed which comprises, opening fibres, forming a thin fibrous web of the thus opened fibres, and simultaneously with forming the web exerting a force on at least a portion of the open fibers in a direction substantially perpendicular to the direction of movement of the web during formation thereof, in such a manner as to increase the proportion of opened fibers in the fibrous web which extend in a direction substantially perpendicular to the direction of movement.

In a preferred manner, the method of the present invention is carried out by cleaning, boiling and bleaching a fibrous material, whereby the bleaching comprises the steps of treating the fibrous material with chlorine at a temperature not exceeding 24° C., briefly rinsing the thus treated material in a peroxide bath at about 85° C., thereafter passing the material through an acid bath, and rinsing, washing and drying the thus bleached material, which bleaching is followed by opening the fibers of the fibrous material, forming a thin fibrous web of the thus opened fibers, and simultaneously with forming the web exerting a force on at least a portion of the opened fibers in a direction substantially perpendicular to the direction of movement of the web during formation thereof in such a manner as to increase the proportion of opened fibers in the fibrous web which extend in a direction substantially perpendicular to the direction of movement.

The present invention refers to a solution of this problem and permits the manufacture of a cigarette filter plug consisting of a fibrous web gathered together at right angles to the axis of the filter and characterized by the fact that in the fibrous web and thus likewise in the filter plug there has been an increase in the individual fibres arranged at right angles to the axis of the filter plug and that at least 50% of all individual fibres are arranged at right angles to the axis of the filter plug.

Furthermore the invention refers to a method for the production of a fibrous web for such cigarette filter plugs which is characterized by the fact that, after preliminary cleaning, boiling and bleaching, the fibres are first opened on a machine in a manner known per se and then formed on a card-like machine into a thin fibrous web, and that during this procedure an additional deflecting force is exerted on at least a part of the individual fibres at right angles to the direction of movement so that thereby the number of individual fibres arranged at right angles to the direction of movement in the fibrous web is increased.

The device according to the invention for the production of such fibrous webs is characterized by the fact that in the machine for making the fibrous web provision is made for at least one roller, co-ordinated therewith and provided with a fine card clothing, which in addition to its rotary motion also performs at least one axial to-and-fro movement per revolution and is capable of exerting a deflecting force on the individual fibres gripped by it.

Some embodiments of the invention are explained in greater detail below in conjunction with FIGS. 1 to 5.

FIGS. 1 and 2 are enlarged reproductions of fibrous webs with an analysis concerning the direction of the fibres therein, wherein FIG. 1 shows a conventional web and FIG. 2 a web in accordance with the present invention;

A loose fibrous web, such as is used to make filter plugs of the type referred to herein, usually is made by spreading a thin sheet of fibres, which may have been derived from a conventional card, on a conveyor belt. Such sheet of fibres may consist of haphazardly arranged fibres in which no preferred direction of the individual fibres can be observed so that all directions occur with equal frequency.

On inspecting such a conventional web under suitable magnification it is frequently possible to observe such haphazard fibre arrangement.

Figure 1:

FIG. 1 shows on the left side an enlarged photograph of an area of such a normal fibrous web. The impression received on viewing the tangle of fibres is that there is no preferred direction among them. Closer examination reveals, however, that this impression is false. In order to determine the distribution of directions among the individual fibres in such a web, seven different horizontal strips were, as indicated in FIG. 1, obtained by masking and inspected more closely in an enlarged photograph as per the left side of FIG. 1. The examination took the form of counting in each of the strips on the one hand the fibres which lay within an angle of −30° to +30° of the direction of movement and on the other hand the number of fibres within the angles of −90° to −30° and +30° to +90°. If the arrangement of the fibres within the web were completely arbitrary, it would be expected that within the first angular range of 60°, i.e. from −30° to +30°, there would be only half as many fibres as in the second angular range of 120°, i.e. from −90° to −30° and from +30° to +90°.

The result of the count carried out in the seven horizontal strips numbered No. 1 to No. 7 in the enlargement of a normal fibrous web are given in the table in FIG. 1. In the table the angular range from −30° to +30° with reference to the direction of movement is designated L and the range from −90° to −30° and from +30° to +90° is designated Q. It is surprising to find, contrary to expectations, that the number of fibres in the angular range L is substantially greater than the number in the angular range Q. It will be seen that the preference for the direction L can be found in a particularly loose portion of the web, as for example strip No. 3, as well as in a particularly dense portion, as for example No. 7. If the mean result of the count for strips No. 1 to 7 is calculated it will be found that in the normal fibrous web as per FIG. 1 the ratio $L/Q$ has the value 3.6, i.e. there are 3.6 times as many fibres in the angular range L as in the angular range Q. In other words, out of the total number of individual fibres considered only 21.3% were arranged within the angular range Q against 78.7% in the angular range L. With a uniform distribution of directions among the fibres in the web, the number of fibres falling within the angular range Q would be about 67% and the number in the range L about 33%. The results obtained per FIG. 1 with a web produced in the normal manner show that there is a clear preference for the direction in which the web moves during its manufacture.

It was supposed on the strength of this newly acquired knowledge that it should be possible to improve the mechanical characteristics of the fibrous web if it were feasible to make a web in which the preferential arrangement of the fibres in the direction of movement could be eliminated. By means of the present method, which will be explained in greater detail below in conjunction with a device suitable for its implementation, it is in fact possible to make a fibrous web in which, averaged over a sufficiently large area, the number of fibres lying approximately at right angles to the direction of movement is at least 50% of the number of those lying approximately in the direction of movement.

Figure 2:
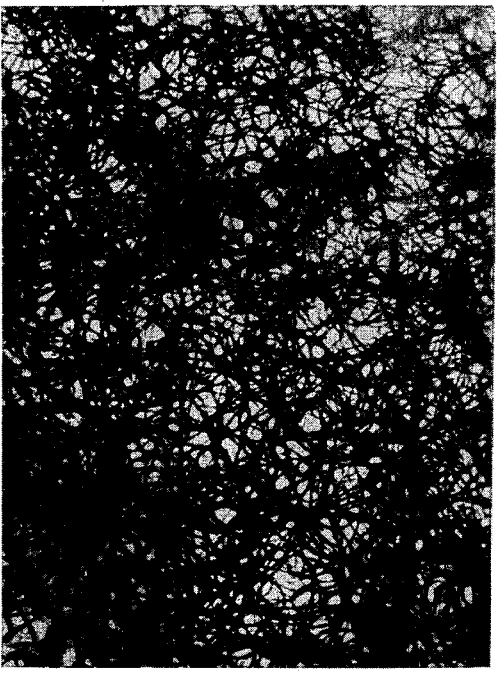

FIG. 2 shows an enlarged photograph of an area of such an improved fibrous web. The weight of the web is identical with the weight of the normal web used for the analysis as per FIG. 1 and the scale of enlargement is the same in both FIG. 1 and FIG. 2. The count of the fibres falling within angular range L and Q was performed in the case of the new "tangled web" as per FIG. 2 in the same manner as described for FIG. 1. The results of the count, however, show substantial differences as compared with the analysis in FIG. 1, for the ratio $L/Q$ is here 1.07 and of the total number of fibres counted an average of about 48% fall within angular range Q and only 52% in angular range L. Thus in the so-called "tangled web" made according to the present method, it has been possible to bring about a substantial increase in the fibres running at right angles to one another.

Experiments with tangled webs of this kind have shown that the mechanical properties in both the dry and wet state are appreciably superior to those of comparable normal webs. It has been shown in particular that when such webs are subjected to the same suction effect, the wet breaking strength of the new tangled web is substantially greater than that of a normal web of the same fibres and of the same weight per unit area. This improvement in the mechanical properties of absorbent fibrous webs effected by increasing the number of fibres running at right angles to one another makes such tangled webs particularly suitable for producing a fibre rope for tobacco products and more especially for filter plugs for cigarettes, etc. It has at the same time been found that, in order to achieve a distinct improvement in the mechanical properties of such webs, while retaining a comparable absorptive power, the number of fibres arranged approximately at right angles to the direction of movement must be at least 50% of the number arranged approximately in the direction of movement. If this percentage is greater, for example in the tangled web as per FIG. 2, the number of fibres arranged approximately at right angles to the direction of movement is about 94% of the number arranged approximately in the direction of movement, there is a correspondingly greater improvement in the mechanical properties.

Figure 3:
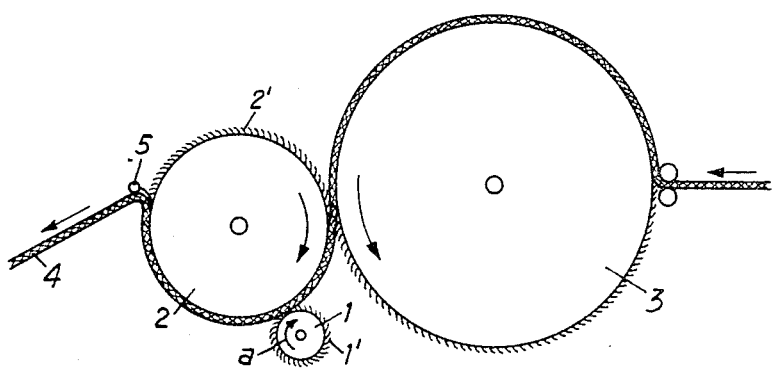
FIGS. 3 and 4 are an elevation and plan view, respectively, of an embodiment of a device for the production of a fibrous web according to the invention, shown diagrammatically.
Figure 4:
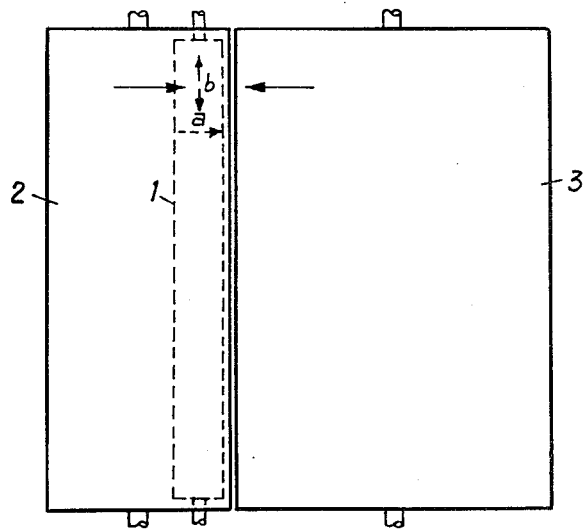

A device for carrying out the present method of increasing the number of fibres crossing at right angles in a fibrous web by superimposing fibres crosswise upon one another is explained in greater detail below in conjunction with FIGS. 3 and 4. The fibres intended for processing are prepared on the known machines used in the spinning mill, opened thereon and treated on a card or breaker card to make a thin, uniform fibrous web.

For the present process the latter machine is provided with an additional device which, instead of producing a web in which the fibres run predominantly lengthwise, permits the number of fibres arranged at right angles to be increased. In the device illustrated in FIGS. 3 and 4, 1 is an additional roller on the card 2, 3, which is covered with a fine card clothing 1'. The doffer and the main cylinder of the card are designated by 2 and 3, respectively. The additional roller 1 is co-ordinated with the doffer 2 and to this end is arranged below and parallel to the axis of the latter in such a manner that its card closing 1' faces into the card clothing 2' of the doffer 2. The additional roller is driven in the same direction as the doffer 2, i.e. the additional roller does not ride on the doffer 2, but their curved surfaces turn in opposed directions as is indicated by the arrows in FIG. 3. At the same time as it turns in the direction $a$, the additional roller 1 performs an axial to-and-fro motion, for example a distance of approximately 15 mm. It was found advantageous for the additional roller to perform three to-and-fro motions per revolution. As a result of this addtional to-and-fro motion of the roller 1, the number of intersecting fibres is increased since a number of the fibres are gripped, pulled out of the direction in which they move forward and superimposed on the untouched fibres. This transverse displacement of the fibres results in an appreciably stronger interlinkage of the fibres than in the normal web and in this manner a self-supporting fibrous structure with a certain rigidity is produced. In the known devices to which the material is passed on leaving the card, the web, which is taken off doffer 2 by means of a stripper 5, is gathered together in the known manner at right angles to the direction of movement to form a fibre rope of round or oval cross-section.

The tangled web produced in the manner described may be made with advantage from naturally hydrophile fibres, such as cotton etc., or preferably from regenerated fibres such as viscose stable-fibre. The fibres intended for the production of the tangle web, which need not be brightened, de-sulphurized and delustred and may be of different lengths of stable and denier, are, by way of example, treated for an hour at 90–95° C. in loose tuft form with soda and various suitable cleaning agents. This treatment is for the purpose of opening up, dissolving and dispersing impurities adhering to the staple-fibres. This serves to obtain the purity of fibre required for filter purposes as well as enhanced absorptive power. Subsequently the scalded viscose staple-fibre or cotton tufts are passed through an acid bath and rinsed well with water.

In order to obtain a pure and permanent white together with the desired stiffness of the viscose staple or cotton fibres, the fibre tufts are bleached for about 30 minutes in chlorine at a temperature not exceeding 24° C. and, after a short rinsing, are treated for about 3 hours at 85° C. in a peroxide bath. The bleached tufts are then passed through the acid bath again, rinsed, thoroughly washed and dried.

This preliminary treatment of the fibres by scalding and bleaching serves to impart to the fibres a firm structure and rough surface in a natural manner and without the aid of any strengthening or stiffening agents. This has the result on the one hand that the web made from this material has great strength without the porosity being impaired and on the other hand that the cleaned surface of the fibre imparts to the fibre rope a very high power of absorption. Where viscose staple-fibre is used as the fibre material, the fibre still consists, after the above treatment, of 100% pure cellulose, i.e. no materials can be found thereon which may have a deleterious effect if the material is used for hygienic purposes.

These boiling and bleaching processes and the machines required therefor are known and are also used, inter-alia, for the bleaching of medicated cotton wool.

Figure 5:
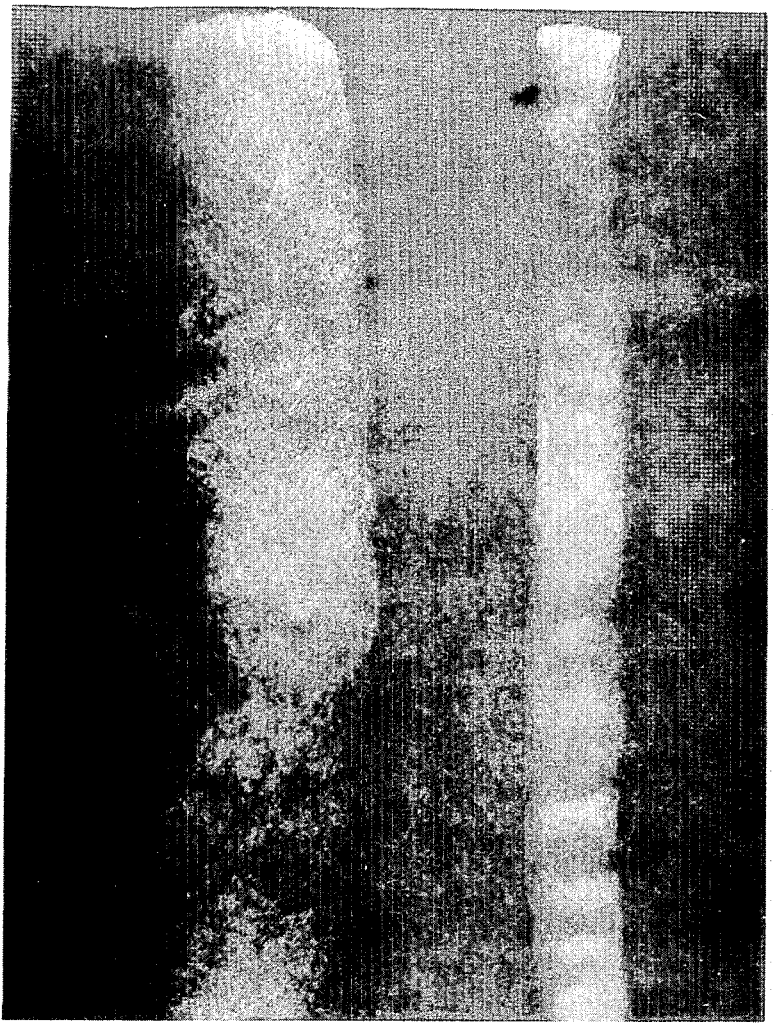
FIG. 5 is the reproduction of a photograph of a normal fibre rope and of one made by the method according to the invention.

The effect of the described increase in the number of fibres running at right angles to the direction of movement in the fibrous web can be very simply demonstrated by drawing the web thus produced through a nozzle with a round cross-section and thereby making it into a so-called sliver. On leaving the nozzle a round sliver is formed whose diameter is greater or smaller according to its elasticity at right angles to its longitudinal axis. If a fibrous web made on the device as per FIGS. 3 and 4 is drawn through a nozzle with an inside diameter of 8 mm. and at first the roller 1 is not moved in an axial direction, the thinner sliver illustrated in FIG. 5 is formed; on the other hand the thicker sliver as per FIG. 5 is produced when the roller 1 performs the axial movement described in the foregoing. The thicker sliver has an average diameter of about 40 mm., the thinner sliver one of only about 20 mm. The density and weight per unit area of the fibrous web are not dependent on the performance of the axial motion of the roller 1. An increase in the volume of the sliver as per FIG. 5 in a ratio of about 1:4 is obtained by raising the number of intersecting fibres and this is due solely to the greater number of bent and pretensioned fibres. The elasticity of the thicker sliver is accordingly greater than that of the thinner sliver made from the fibrous web known hitherto.

If a tangled web of the kind described in the foregoing is made into a filter rope and filter plugs, these will have an excellent strength despite low resistance to suction, both in the unused condition and in use, without any additional measures being taken to procure an artificial supporting skeleton.

Having now particularly described and ascertained the nature of my said invention and in what manner the same is to be performed, I declare that what I claim is:

The method of making a tobacco smoke filter which comprises cleaning and boiling a fibrous material; bleaching said material by treating the same with chlorine at a temperature not exceeding 24° C.; briefly rinsing the thus treated material in a peroxide bath at about 85° C.; thereafter passing said material through an acid bath; rinsing, washing and drying the thus bleached material; opening the fibers of the thus treated fibrous material; forming a thin fibrous web of the thus opened fibers; and simultaneously with forming said web exerting a force on at least a portion of said opened fibers in a direction substantially perpendicular to the direction of movement of said web during formation thereof in such a manner as to increase the proportion of opened fibers in said fibrous web which extends in a direction substantially perpendicular to said direction of movement to at least about 50% of the number of fibers extending approximately in said direction of movement.

References Cited by the Examiner
UNITED STATES PATENTS

| | | | |
|---|---|---|---|
| 8,948 | 5/1852 | Holmes et al. | 19—150 |
| 25,153 | 8/1859 | Wethered | 19—100 |
| 75,906 | 3/1868 | Haythorn et al. | 19—100 |
| 125,447 | 4/1872 | French | 19—100 |
| 1,784,566 | 12/1930 | Andrews | 131—10 X |
| 2,765,515 | 10/1956 | Knudson | 28—72 |
| 2,774,680 | 12/1956 | Hackney et al. | 117—17 |
| 2,794,480 | 6/1957 | Crawford et al. | 154—1.7 |
| 2,916,039 | 12/1959 | Muller | 131—208 |
| 2,992,154 | 7/1961 | Mauthner et al. | 131—10 X |
| 3,012,302 | 12/1961 | Parmele et al. | 28—1 |

DONALD W. PARKER, *Primary Examiner.*

ABRAHAM G. STONE, RUSSELL C. MADER,
*Examiners.*